United States Patent
Murakami

(10) Patent No.: US 9,742,283 B2
(45) Date of Patent: Aug. 22, 2017

(54) SWITCHING POWER SUPPLY

(71) Applicant: Rohm Co., Ltd., Kyoto (JP)

(72) Inventor: Kazuhiro Murakami, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/930,773

(22) Filed: Nov. 3, 2015

(65) Prior Publication Data

US 2016/0141959 A1    May 19, 2016

(30) Foreign Application Priority Data

Nov. 18, 2014  (JP) ................. 2014-233599

(51) Int. Cl.
  *G05F 1/565* (2006.01)
  *G05F 1/00* (2006.01)
  *H02M 3/158* (2006.01)
  *H02M 3/156* (2006.01)

(52) U.S. Cl.
  CPC .. *H02M 3/1588* (2013.01); *H02M 2003/1566* (2013.01); *Y02B 70/1466* (2013.01)

(58) Field of Classification Search
  CPC . G05F 1/56; G05F 1/565; G05F 1/575; G05F 1/59; G05F 1/595; H02M 3/158
  USPC ................. 323/274, 275, 283–285
  See application file for complete search history.

(56) References Cited

U.S. PATENT DOCUMENTS

| | | | | |
|---|---|---|---|---|
| 7,701,188 B2* | 4/2010 | Kojima | ............... | H02M 3/1588 323/225 |
| 8,319,487 B2* | 11/2012 | Michishita | ............ | H02M 3/156 323/223 |
| 8,493,050 B2* | 7/2013 | Miyamae | ............... | H02M 3/156 323/284 |
| 2006/0208717 A1* | 9/2006 | Shimizu | ............... | H02M 3/157 323/284 |
| 2011/0018516 A1* | 1/2011 | Notman | ............... | H02M 3/1588 323/284 |

FOREIGN PATENT DOCUMENTS

| | | |
|---|---|---|
| JP | 2005-237099 | 9/2005 |
| JP | 2014-087159 | 5/2014 |

\* cited by examiner

*Primary Examiner* — Adolf Berhane
*Assistant Examiner* — Gary Nash
(74) *Attorney, Agent, or Firm* — Fish & Richardson P.C.

(57) ABSTRACT

A power supply control IC includes: a switching control circuit of a fixed on-time type configured to generate an output voltage from an input voltage by driving an inductor by complimentarily turning on/off an output transistor and a synchronous rectification transistor based on a result of comparison between a predetermined reference voltage and a feedback voltage in accordance with the output voltage. The switching control circuit extends an on-time of the output transistor more when a backflow of a coil current is detected than when the backflow is not detected.

13 Claims, 15 Drawing Sheets

SWITCHING POWER SUPPLY

CROSS-REFERENCE TO RELATED APPLICATION

This application is based upon and claims the benefit of priority from Japanese Patent Application No. 2014-233599, filed on Nov. 18, 2014, the entire contents of which are incorporated herein by reference.

TECHNICAL FIELD

The present disclosure relates to a switching power supply.

BACKGROUND

A switching power supply of a non-linear control type (for example, fixed on-time type, fixed off-time type or hysteresis window type) is characterized in that, compared with a switching power supply of a linear control type (for example, voltage mode control type or current mode control type), high load response characteristics can be obtained with a simpler circuit configuration.

Such a switching power supply may also have a function of detecting a backflow of a coil current when there is a light load to forcibly turn off a synchronous rectification transistor (a so-called backflow blocking function).

However, the conventional switching power supply has a problem in that switching between a continuous current mode (a heavy load state in which no backflow blocking operation is performed) and a discontinuous current mode (a light load state in which a backflow blocking operation is performed) is not smoothly performed such that the backflow blocking operation is intermittently performed and an output ripple increases.

SUMMARY

The present disclosure provides some embodiments of a power supply control IC which is capable of smoothly switching between a continuous current mode and a discontinuous current mode, a switching power supply including the power supply control IC, and an electronic apparatus equipped with the switching power supply.

According to one embodiment of the present disclosure, there is provided a power supply control IC including: a switching control circuit of a fixed on-time type configured to generate an output voltage from an input voltage by driving an inductor by complimentarily turning on/off an output transistor and a synchronous rectification transistor based on a result of comparison between a predetermined reference voltage and a feedback voltage in accordance with the output voltage, wherein the switching control circuit extends an on-time of the output transistor more when a backflow of a coil current is detected than when the backflow is not detected.

In the power supply control IC, the switching control circuit may increase an amount of the extension of the on-time as a switching period of the output transistor becomes shorter.

In the power supply control IC, the switching control circuit may include: a reference voltage generation circuit that generates the reference voltage; a main comparator that generates a comparison signal by comparing the feedback voltage with the reference voltage; a one-shot pulse generation circuit that generates a one-shot pulse in a set signal in accordance with the comparison signal; an RS flip-flop that sets an output signal to a first logical level in accordance with the set signal and resets the output signal to a second logical level in accordance with a reset signal; an on-time setting circuit that generates a one-shot pulse in the reset signal when the on-time elapses after the output signal is set to the first logical level; a gate driver circuit that generates a drive signal of the output transistor and the synchronous rectification transistor in accordance with the output signal; and a backflow detection circuit that detects the backflow of the coil current and forcibly turns off the synchronous rectification transistor.

In the power supply control IC, the switching control circuit may further include a ripple injection circuit that generates the feedback voltage by superimposing a ripple voltage simulating the coil current on a divided voltage of the output voltage.

In the power supply control IC, the on-time setting circuit may include: a first voltage generator that generates a first voltage having a ramp waveform; a second voltage generator that generates a second voltage based on a result of the detection of backflow of the coil current; and a comparator that generates the reset signal by comparing the first voltage with the second voltage.

In the power supply control IC, the second voltage generator may include: a voltage divider that generates a divided voltage by dividing the output voltage; and a boost circuit that instantaneously pulls up the divided voltage when the backflow of the coil current is detected and then settles the pulled-up voltage down to an original voltage value with a predetermined time constant, wherein the second voltage generator outputs the divided voltage or a voltage in accordance with the divided voltage as the second voltage.

In the power supply control IC, the voltage divider may include: a first resistor having a first end connected to an application terminal of the output voltage; and a second resistor having a first end connected to an output terminal of the divided voltage and a second end connected to a ground terminal, and the boost circuit may include: a transistor having a drain connected to a second end of the first resistor, a source connected to the output terminal of the divided voltage, and a gate connected to an output terminal of the backflow detection circuit; and a capacitor connected between the gate and the drain of the transistor.

In the power supply control IC, the voltage divider may include: a first resistor having a first end connected to an application terminal of the output voltage and a second end connected to an output terminal of the divided voltage; and a second resistor having a first end connected to an output terminal of the divided voltage and a second end connected to a ground terminal, and the boost circuit may include: a first transistor having a source connected to a power supply terminal, a gate and a drain, the gate and the drain being connected in common; a second transistor having a source connected to the power supply terminal, a drain connected to the output terminal of the divided voltage, and a gate connected to the gate of the first transistor; a resistor connected between the source and the drain of the first transistor; and a capacitor connected between the drain of the first transistor and an output terminal of the backflow detection circuit.

In the power supply control IC, the second voltage generator may generate the second voltage based on an on-duty cycle of the output transistor when the backflow of the coil current is not detected, and generate the second voltage based on the divided voltage when the backflow of the coil current is detected.

In the power supply control IC, the first voltage generator may generate the first voltage by charging/discharging a capacitor using a charging current in accordance with the input voltage.

According to another embodiment of the present disclosure, there is provided a switching power supply including: the above-described power supply control IC; and a switch output stage that is partially or entirely externally attached to the power supply control IC and generates an output voltage from an input voltage.

According to another embodiment of the present disclosure, there is provided an electronic apparatus including: the above-described switching power supply; and a load which is operated with an output voltage supplied from the switching power supply.

DETAILED DESCRIPTION

<Switching Power Supply>

Figure 1:
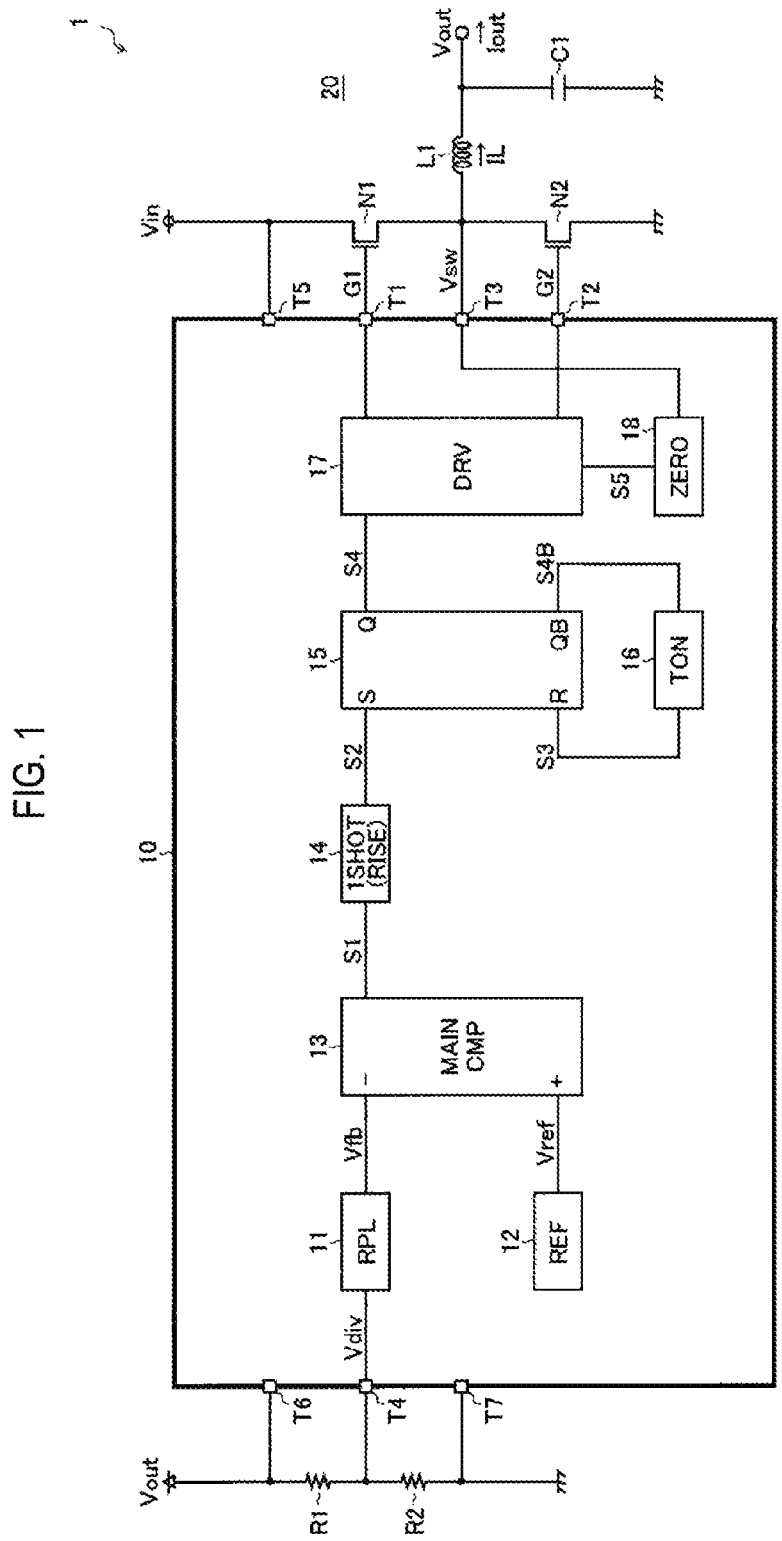
FIG. 1 is a block diagram showing an overall configuration of a switching power supply.

FIG. 1 is a block diagram showing an overall configuration of a switching power supply. A switching power supply 1 in this configuration example is a step-down DC/DC converter for generating an output voltage Vout from an input voltage Vin according to a non-linear control scheme (bottom detection fixed on-time scheme). The switching power supply 1 has a semiconductor device 10 and a switch output stage 20 formed by various discrete parts (N channel type MOS (Metal Oxide Semiconductor) field effect transistors N1 and N2, an inductor L1, a capacitor C1, and resistors R1 and R2) externally attached to the semiconductor device 10.

The semiconductor device 10 generally controls the overall operation of the switching power supply 1 (a so-called power supply control IC). The semiconductor device 10 has external terminals T1 to T7 (upper gate terminal T1, lower gate terminal T2, switch terminal T3, feedback terminal T4, input voltage terminal T5, output voltage terminal T6, and ground terminal T7) to establish electrical connections outside the device.

The external terminal T1 is connected to a gate of the transistor N1. The external terminal T2 is connected to a gate of the transistor N2. The external terminal T3 is connected to an application terminal of a switch voltage Vsw (a connection node between a source of the transistor N1 and a drain of the transistor N2). The external terminal T4 is connected to an application terminal of a divided voltage Vdiv (a connection node between the resistor R1 and the resistor R2). The external terminal T5 is connected to an application terminal of the input voltage Vin. The external terminal T6 is connected to an application terminal of the output voltage Vout. The external terminal T7 is connected to a ground terminal.

Next, the connection relationships among the discrete parts externally attached to the semiconductor device 10 will be described. The drain of the transistor N1 is connected to the application terminal of the input voltage Vin. The source of the transistor N2 is connected to the ground terminal. The source of the transistor N1 and the drain of the transistor N2 are both connected to the first end of the inductor L1. The second end of the inductor L1 and the first end of the capacitor C1 are both connected to the application terminal of the output voltage Vout. The second end of the capacitor C1 is connected to the ground terminal. The resistor R1 and the resistor R2 are connected in series between the application terminal of the output voltage Vout and the ground terminal.

The transistor N1 is an output transistor which is on/off controlled in accordance with a gate signal G1 inputted from the external terminal T1. The transistor N2 is a synchronous rectification transistor which is on/off controlled in accordance with a gate signal G2 inputted from the external terminal T2. As a rectification element, a diode may be used in place of the transistor N2. In addition, the transistors N1 and N2 may be incorporated in the semiconductor device 10. The inductor L1 and the capacitor C1 function as a rectifying/smoothing part for generating the output voltage Vout by rectifying and smoothing the switch voltage Vsw having a rectangular waveform appearing on the external terminal T3. The resistors R1 and R2 function as a divided voltage generating part for generating the divided voltage Vdiv by dividing the output voltage Vout.

Next, the internal configuration of the semiconductor device 10 will be described. In the semiconductor device 10, a ripple injection circuit 11, a reference voltage generation circuit 12, a main comparator 13, a one-shot pulse generation circuit 14, an RS flip-flop 15, an on-time setting circuit 16, a gate driver circuit 17, and a backflow detection circuit 18 are integrated.

The ripple injection circuit 11 adds a ripple voltage Vrpl (a pseudo ripple component simulating a coil current IL flowing through the inductor L1) to the divided voltage Vdiv to generate a feedback voltage Vfb (=Vdiv+Vrpl). With this ripple injection technique introduced, even when a ripple component of the output voltage Vout (further the divided voltage Vdiv) is not so large, stable switching control can be performed and thus it is possible to use, as the capacitor C1, a laminated ceramic capacitor having a small ESR. However, if the ripple component of the output voltage Vout is sufficiently large, the ripple injection circuit 11 may be omitted.

The reference voltage generation circuit 12 generates a predetermined reference voltage Vref.

The main comparator 13 compares the feedback voltage Vfb inputted to an inverting input terminal (−) with the reference voltage Vref inputted to a non-inverting input terminal (+) and generates a comparison signal S1 based on a result of the comparison. The comparison signal S1 has a low level when the feedback voltage Vfb is higher than the reference voltage Vref, and has a high level when the feedback voltage Vfb is lower than the reference voltage Vref.

The one-shot pulse generation circuit 14 generates a one-shot pulse in a set signal S2 with a rising edge of the comparison signal S1 as a trigger.

The RS flip-flop 15 sets an output signal S4 to a high level at a rising edge of the set signal S2 inputted to a set terminal S and resets the output signal S4 to a low level at a rising edge of a reset signal S3 inputted to a reset terminal R.

After a predetermined on-time Ton has elapsed since a fall of an inverted output signal S4B (a logical inversion of the output signal S4) of the RS flip-flop 15 to a low level, the on-time setting circuit 16 generates a one-shot pulse in the reset signal S3.

The gate driver circuit 17 generates the gate signals G1 and G2 in accordance with the output signal S4 of the RS flip-flop 15 and switches the transistors N1 and N2 complimentarily. As used herein, the term "complementary" is intended to include not only a case where on/off of the transistors N1 and N2 is completely contrary to each other but also a case where a delay is given to an on/off transition timing of the transistors N1 and N2 from the viewpoint of prevention of a through-current (a case where a simultaneous off-period (dead time) is provided).

The backflow detection circuit 18 monitors a backflow of the coil current IL (a coil current IL flowing from the inductor L1 to the ground terminal via the transistor N2) and generates a backflow detection signal S5 based on a result of the monitoring. In a case when the backflow of the coil current IL is detected, the backflow detection signal S5 is latched to a high level (a logical level at the time of backflow detection), and at a rising edge of the gate signal G1 in the next period, the backflow detection signal S5 is reset to a low level (a logical level at the time of backflow non-detection). The backflow of the coil current IL may be monitored by, for example, detecting a zero-cross point at which the switch voltage Vsw is switched from negative to positive during the on-period of the transistor N2. When the backflow detection signal S5 has a high level, the gate driver circuit 17 generates the gate signal G2 to forcibly turn off the transistor N2 without depending on the output signal S4.

The ripple injection circuit 11, the reference voltage generation circuit 12, the main comparator 13, the one-shot pulse generation circuit 14, the RS flip-flop 15, the on-time setting circuit 16, the gate driver circuit 17, and the backflow detection circuit 18 above function as a switching control circuit of the non-linear control type (bottom detection fixed on-time type in this configuration example) for generating the output voltage Vout from the input voltage Vin by performing the on/off control of the transistors N1 and N2 based on the result of the comparison between the feedback voltage Vfb and the reference voltage Vref.

<Switching Operation>

Figure 2:
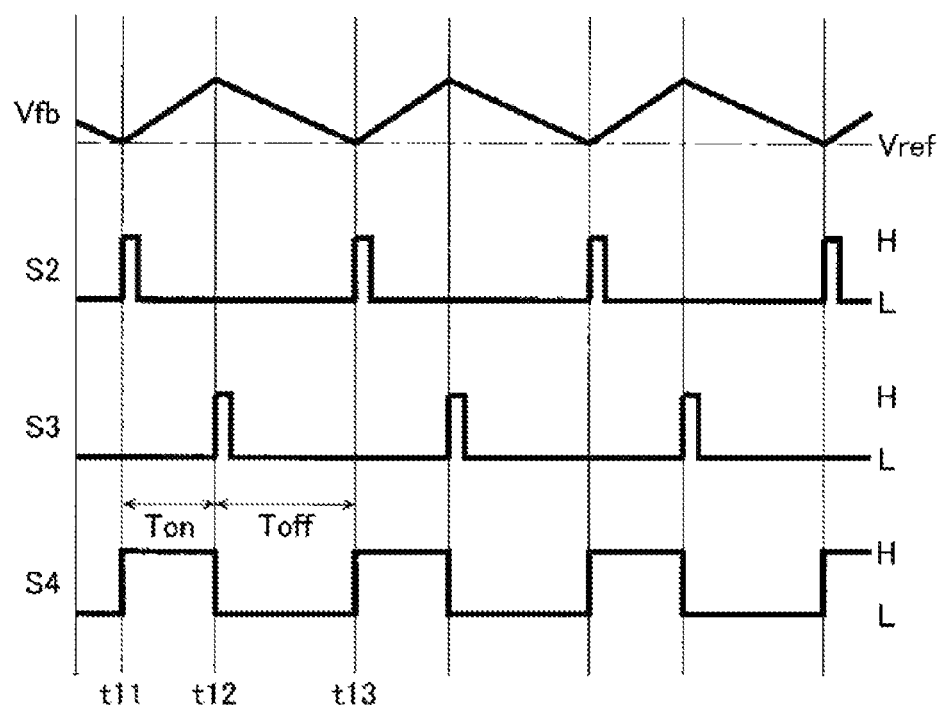
FIG. 2 is a timing chart showing a switching operation when there is a heavy load.

FIG. 2 is a timing chart showing a switching operation in the case of a heavy load (continuous current mode), depicting the feedback voltage Vfb, the set signal S2, the reset signal S3, and the output signal S4 in this order from the top.

At a time t11, when the feedback voltage Vfb drops to the reference voltage Vref, the set signal S2 rises to a high level and the output signal S4 is transitioned to a high level. Accordingly, the transistor N1 is turned on and the feedback voltage Vfb turns to rise.

Thereafter, with the lapse of the on-time Ton, at a time t12, when the reset signal S3 rises to a high level, the output signal S4 is transitioned to a low level. Accordingly, the transistor N1 is turned off and the feedback voltage Vfb turns to drop again.

The gate driver circuit 17 generates the gate signals G1 and G2 in accordance with the output signal S4 and uses the gate signals G1 and G2 to perform the on/off control of the transistors N1 and N2. Specifically, when the output signal S4 is at the high level, basically, the gate signal G1 has a high level and the transistor N1 is turned on, while the gate signal G2 has a low level and the transistor N2 is turned off. Conversely, when the output signal S4 is at the low level, basically, the gate signal G1 has a low level and the transistor N1 is turned off, while the gate signal G2 has a high level and the transistor N2 is turned on.

According to the above-described on/off control of the transistors N1 and N2, the switch voltage Vsw having a rectangular waveform appears on the external terminal T3. The switch voltage Vsw is rectified and smoothed by the inductor L1 and the capacitor C1, thereby generating the output voltage Vout. In addition, the output voltage Vout is divided by the resistors R1 and R2, thereby generating the divided voltage Vdiv (further the feedback voltage Vfb). According to such output feedback control, the switching power supply 1 can generate a desired output voltage Vout from the input voltage Vin with a very simple configuration.

<Backflow Blocking Operation>

Figure 3:
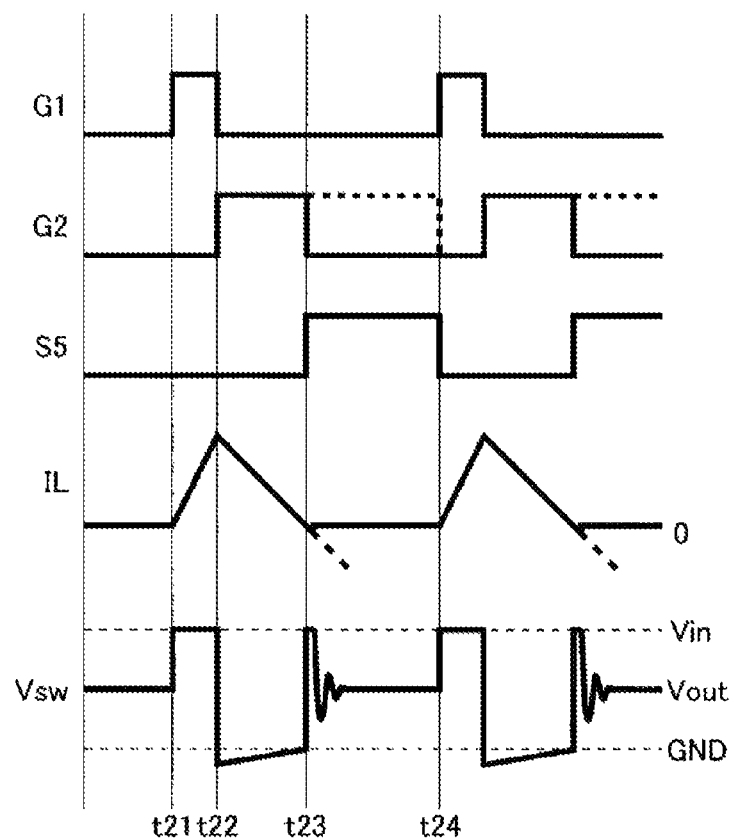
FIG. 3 is a timing chart showing a backflow blocking operation when there is a light load.

FIG. 3 is a timing chart showing a backflow blocking operation in the case of a light load (discontinuous current mode), depicting the gate signals G1 and G2, the backflow detection signal S5, the coil current IL, and the switch voltage Vsw in this order from the top.

From a time t21 to a time t22, since the gate signal G1 is at a high level and the gate signal G2 is at a low level, the transistor N1 is turned on and the transistor N2 is turned off. Accordingly, from the time t21 to the time t22, the switch voltage Vsw rises to nearly the input voltage Vin and the coil current IL increases.

At the time t22, when the gate signal G1 is dropped to a low level and the gate signal G2 rises to a high level, the transistor N1 is turned off and the transistor N2 is turned on. Accordingly, the switch voltage Vsw drops to a negative voltage (=GND−IL×RN2, where RN2 denotes on-resistance of the transistor N2) and the coil current IL turns to decrease.

Here, when there is a heavy load and an output current Iout is sufficient large, energy stored in the inductor L1 is large; accordingly, the coil current IL continues to flow toward the load without falling below a zero value and the switch voltage Vsw is maintained at a negative voltage up to a time t24 at which the gate signal G1 is raised again to the high level. On the other hand, when there is a light load and the output current Iout is small, energy stored in the inductor L1 is small; accordingly, at the time t23, the coil current IL falls below the zero value and a backflow of the coil current IL occurs, whereby the polarity of the switch voltage Vsw is switched from negative to positive. In such a state, electric charges stored in the capacitor C1 are discarded to the ground terminal, leading to a decrease in efficiency when there is a light load.

Therefore, the switching power supply 1 is configured to detect the backflow of the coil current IL (polarity reversal of the switch voltage Vsw) by using the backflow detection circuit 18 and forcibly turn off the transistor N2 in the high level period (from the time t23 to the time t24) of the backflow detection signal S5. This configuration allows the backflow of the coil current IL to be quickly blocked, thereby eliminating a decrease in efficiency in the case of a light load.

<Change in Output Behavior Depending on Increase/Decrease of Load>

Figure 4:
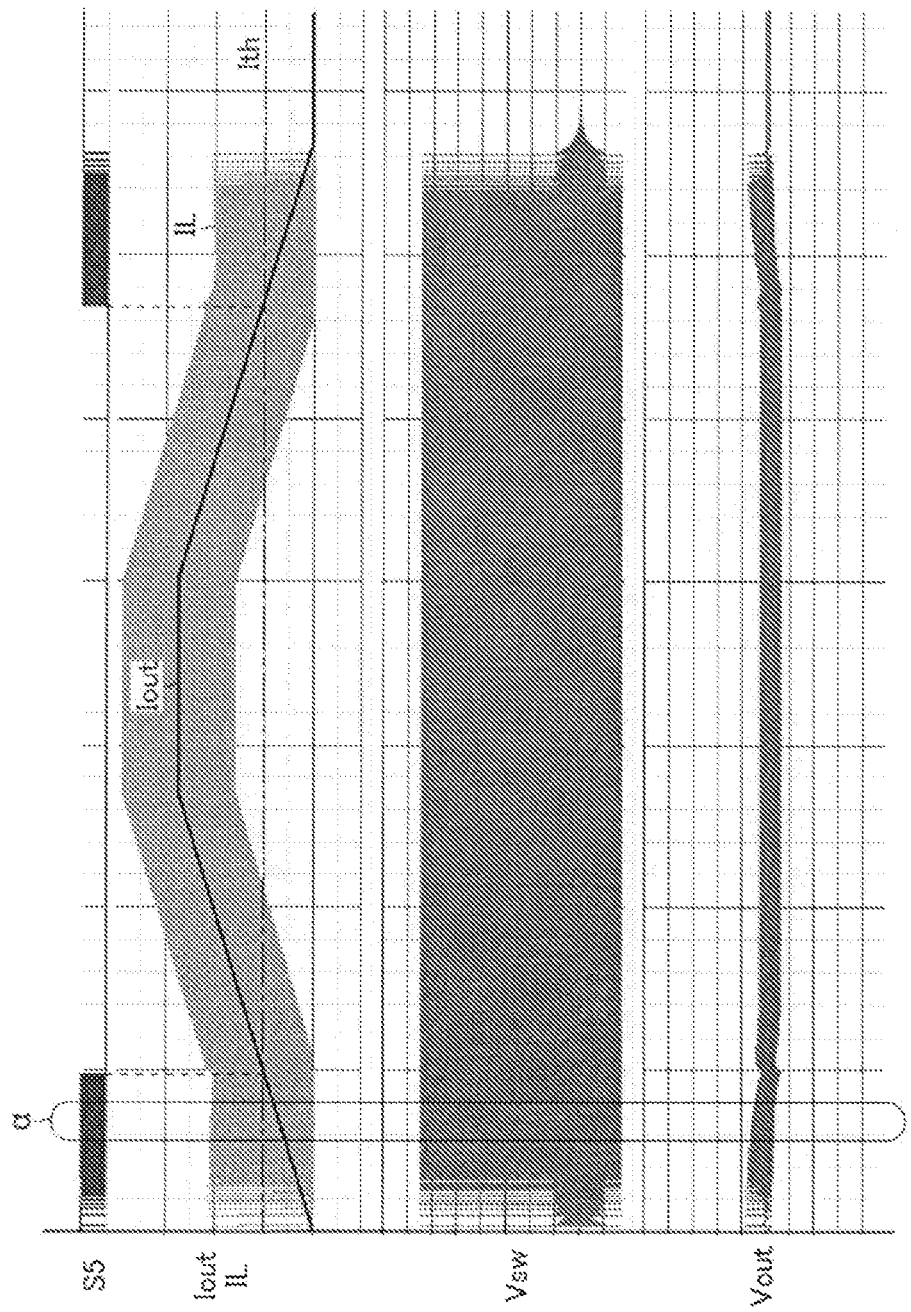
FIG. 4 is a timing chart showing a first transition example in output behavior depending on increase/decrease of load.
Figure 5:
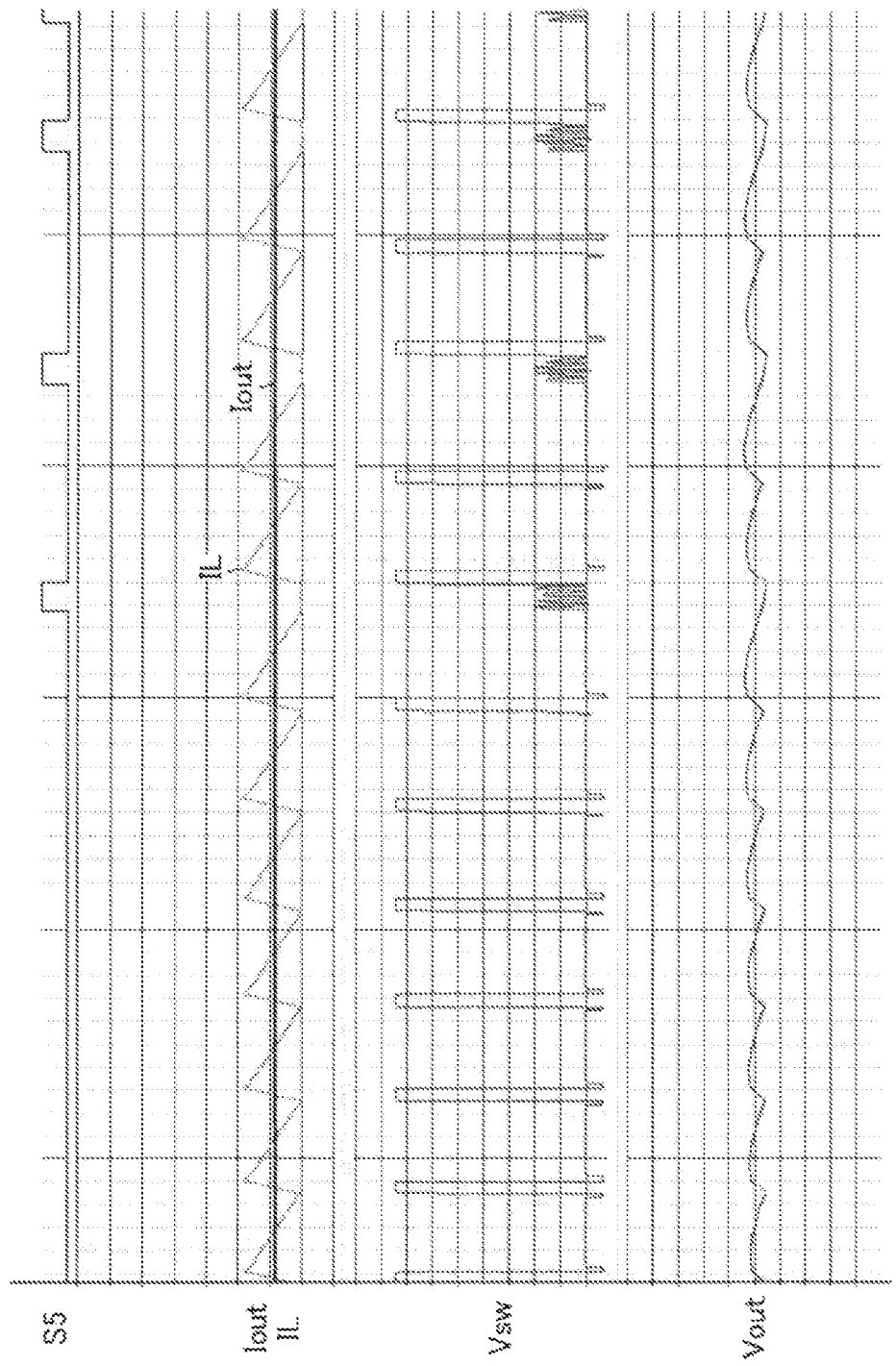
FIG. 5 is an enlarged view of a region α.

FIG. 4 is a timing chart showing a first transition example (with no offset to a threshold current Ith) in output behavior depending on increase/decrease of load, depicting the backflow detection signal S5, the output current Iout, the coil current IL, the switch voltage Vsw, and the output voltage Vout in this order from the top. FIG. 5 is an enlarged view of a region α in FIG. 4.

In the case of the light load where the output current Iout is smaller than the threshold current Ith, the coil current IL falls below the zero value during an on-period of the transistor N2. In such an operation state (discontinuous current mode), since the transistor N2 is forcibly turned off when the backflow detection signal S5 rises to the high level, the backflow of the coil current IL is blocked (see FIG. 3).

On the other hand, in the case of the heavy load where the output current Iout is larger than the threshold current Ith, the coil current IL does not fall below the zero value during the on-period of the transistor N2. In such an operation state (continuous current mode), since the backflow detection signal S5 is maintained at the low level, the transistor N2 is not forced to be turned off (see FIG. 2).

However, as shown in FIG. 5, since the switching between the continuous current mode and the discontinuous current mode is irregularly repeated at the transition from the light load to the heavy load (or from the heavy load to the light load), a ripple component of the output voltage Vout is increased, thereby distorting a waveform of the output voltage Vout. This problem is caused because the threshold current Ith, which is an operation mode switching point in both of a sweep-up and a sweep-down of the output current Iout, has the same value (for example, 1A).

In view of this problem, in the switching power supply 1, particularly, the on-time setting circuit 16 is configured to provide hysteresis characteristics to the threshold current Ith. The configuration and operation of the on-time setting circuit 16 will be described below by way of examples.

<On-Time Setting Circuit>

Figure 6:
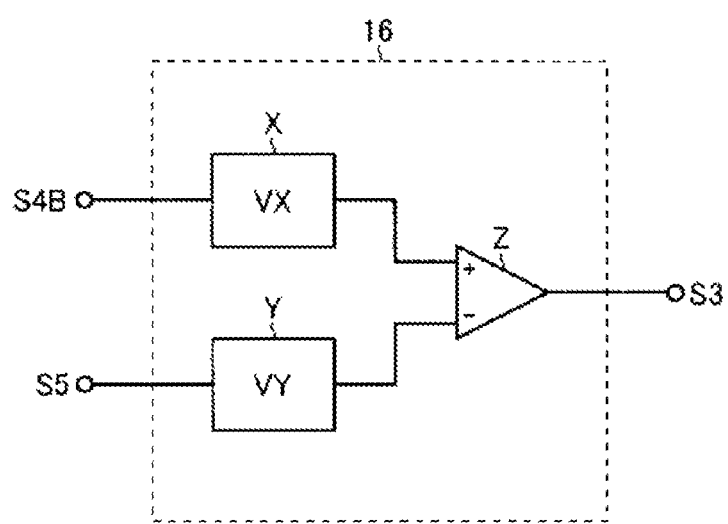
FIG. 6 is a block diagram showing one configuration example of an on-time setting circuit 16.

FIG. 6 is a block diagram showing one configuration example of the on-time setting circuit 16. The on-time setting circuit 16 includes a first voltage generator X, a second voltage generator Y, and a comparator Z.

The first voltage generator X receives the inverted output signal S4B and generates a first voltage VX having a ramp waveform. The first voltage VX rises with a predetermined gradient when the inverted output signal S4B is at a high level, and the first voltage VX is reset to a zero value when the inverted output signal S4B is at a low level.

The second voltage generator Y receives the backflow detection signal S5 (corresponding to a result of the detection of backflow of the coil current IL) and generates a second voltage VY. The second voltage VY is higher in the case of a light load (discontinuous current mode) where the backflow detection signal S5 is at a high level than in the case of a heavy load (continuous current mode) where the backflow detection signal S5 is not at a high level, which will be described later.

The comparator Z compares the first voltage VX inputted from the first voltage generator X to a non-inverting input terminal (+) with the second voltage VY inputted from the second voltage generator Y to an inverting input terminal (−) and generates the reset signal S3 based on a result of the comparison. The reset signal S3 has a high level when the first voltage VX is higher than the second voltage VY. Conversely, the reset signal S3 has a low level when the first voltage VX is lower than the second voltage VY.

Accordingly, when the second voltage VY increases in the case of a light load, the rising timing of the reset signal S3 is slower than in the case of a heavy load and further the on-time Ton of the transistor N1 is extended. In this way, the on-time setting circuit 16 switches the on-time Ton based on the result of detection of the coil current IL, whose significance will be described later.

Figure 7:
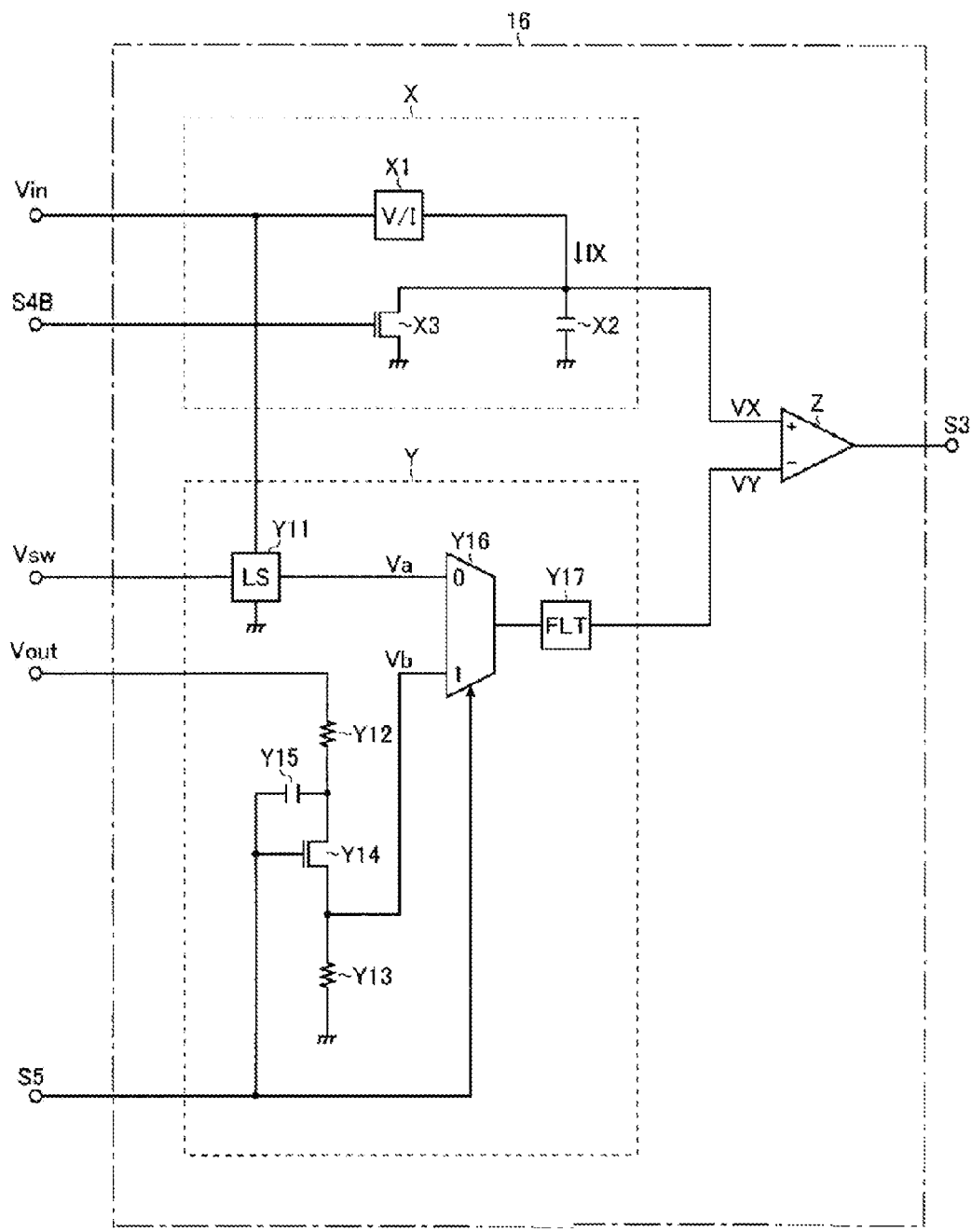
FIG. 7 is a circuit diagram showing one configuration example of a first voltage generator X and a second voltage generator Y.

FIG. 7 is a circuit diagram showing one configuration example of the first voltage generator X and the second voltage generator Y. The first voltage generator X in this configuration example includes a voltage/current converter X1, a capacitor X2, and an N channel type MOS field effect transistor X3.

The voltage/current converter X1 generates a charging current IX ($=a \times Vin$, where a is the constant of proportionality) by converting the input voltage Vin to a current. A current value of the charging current IX varies with a voltage value of the input voltage Vin. Specifically, the higher the input voltage Vin is, the larger the charging current IX is; and the lower the input voltage Vin is, the smaller the charging current IX is.

The first end of the capacitor X2 is connected to an output terminal of the voltage/current converter X1. The second end of the capacitor X2 is connected to a ground terminal. When the transistor X3 is turned off, the capacitor X2 is charged with the charging current IX and the first voltage VX appearing on the first end of the capacitor X2 rises accordingly. On the other hand, when the transistor X3 is turned on, the capacitor X2 is discharged via the transistor X3 and the first voltage VX drops accordingly.

The transistor X3 serves as a charging/discharging switch for switching between charging and discharging of the capacitor X2 in accordance with the on/off control of the transistors N1 and N2. The drain of the transistor X3 is connected to the first end of the capacitor X2. The source of the transistor X3 is connected to the ground terminal. The gate of the transistor X3 is connected to an application terminal of the inverted output signal S4B. The transistor X3 is turned on when the inverted output signal S4B is at a high level, and the transistor X3 is turned off when the inverted output signal S4B is at a low level.

In this way, the first voltage generator X generates the first voltage VX by charging or discharging the capacitor X2 using the charging current IX which depends on the input voltage Vin.

In addition, the second voltage generator Y in this configuration example includes a level shifter Y11, resistors Y12 and Y13 (having resistances RY12 and RY13, respectively), an N channel type MOS field effect transistor Y14, a capacitor Y15, a selector Y16, and a filter Y17.

The level shifter Y11 is supplied with the input voltage Vin, as its power supply voltage, and performs level-shifting with respect to the switch voltage Vsw. More specifically, the level shifter Y11 generates a pulse voltage Va that is driven between the input voltage Vin (or its divided voltage)

and the ground voltage GND by performing level-shifting with respect to the switch voltage Vsw, and outputs the pulse voltage Va to a first input terminal of the selector Y16. In addition, the gate signal G1 instead of the switch voltage Vsw may be inputted to the level shifter Y11.

The first end of the resistor Y12 is connected to the application terminal of the output voltage Vout. The second end of the resistor Y12 is connected to the drain of the transistor Y14. The source of the transistor Y14 corresponding to an output terminal of the divided voltage Vb is connected to the second input terminal of the selector Y16 and the first end of the resistor Y13. The second end of the resistor Y13 is connected to the ground terminal. The gate of the transistor Y14 is connected to an input terminal of the backflow detection signal S5. The capacitor Y15 is connected between the gate and the drain of the transistor Y14. A parasitic capacitor of the transistor Y14 may be diverted to the capacitor Y15.

The resistors Y12 and Y13 above function as a voltage divider for dividing the output voltage Vout by a predetermined division ratio N (=(RY12+RY13)/RY13) to generate a divided voltage Vb (=Vout/N). In addition, the transistor Y14 and the capacitor Y15 function as a boost circuit for instantaneously pulling up the divided voltage Vb in the case of detection of backflow of the coil current IL (S5=H) and then settling it down to the original voltage value (=Vout/N) with a predetermined time constant τ. The operation of generating the divided voltage Vb and the associated on-time variation operation will be described later.

The selector Y16 selects and outputs one of the pulse voltage Va and the divided voltage Vb in accordance with the backflow detection signal S5. More specifically, the selector Y16 selects and outputs the pulse voltage Va when the backflow of the coil current IL is not detected (S5=L), while selecting and outputting the divided voltage Vb when the backflow of the coil current IL is detected (S5=H).

The filter Y17 generates the second voltage VY by smoothing an output of the selector Y16. More specifically, since the pulse voltage Va is inputted to the filter Y17 when the backflow of the coil current IL is not detected (S5=L), the second voltage VY according to the on-duty cycle of the transistor N1 is generated. On the other hand, when the backflow of the coil current IL is detected (S5=H), basically, the second voltage VY according to the divided voltage Vb (further the output voltage Vout) is generated. For example, a RC filter (whose number of stages is optional) including a resistor and a capacitor may be suitably used as the filter Y17.

<On-Time Setting Operation (Basics)>

The basic operation of the above-configured on-time setting circuit 16 will be described in detail below for a case of non-detection of backflow of the coil current IL (continuous current mode) and a case of detection of backflow of the coil current IL (discontinuous current mode).

First, the case of non-detection of backflow of the coil current IL (continuous current mode) will be described in detail. In the case of non-detection of backflow of the coil current IL, since the backflow detection signal S5 is at the low level, the selector Y16 selects the pulse voltage Va and outputs it to the filter Y17. As a result, since the second voltage VY is a variable value in accordance with the duty cycle of the pulse voltage Va, the time taken for the first voltage VX to exceed the second voltage VY (corresponding to the on-time Ton) is set to a variable value in accordance with the on-duty cycle (=(Vout+Iout×RN1)/Vin, where RN1 is the on-resistance of the transistor N1).

Next, the case of detection of backflow of the coil current IL (discontinuous current mode) will be described in detail. In the case of detection of backflow of the coil current IL, since the backflow detection signal S5 is at the high level, the selector Y16 selects the divided voltage Vb and outputs it to the filter Y17. As a result, since the second voltage VY is basically a variable value in accordance with the output voltage Vout, the on-time Ton is set to a variable value in accordance with the input voltage Vin and the output voltage Vout.

As described above, the on-time setting circuit 16 sets the on-time Ton to a variable value in accordance with the on-duty cycle of the transistor N1 or a variable value in accordance with the input voltage Vin and the output voltage Vout, instead of a fixed value.

With the above-described configuration, it is possible to suppress variation of the switching frequency without impairing advantages of the non-linear control type. Accordingly, it is possible to achieve improvements in output voltage accuracy and load regulation characteristics and further facilitate measures to prevent EMI (Electromagnetic Interference) and noise in a set design. In addition, it is possible to apply, without any trouble, the switching power supply 1 as power supply means for applications having large variations of input voltages and applications requiring a variety of output voltages.

In addition, the on-time setting circuit 16 of this configuration example has a function to boost the divided voltage Vb and intentionally extend the on-time Ton when the backflow of the coil current IL is detected, in order to smoothly switch between the continuous current mode and the discontinuous current mode. The divided voltage boost operation of the second voltage generator Y will be described in detail below.

In a case where there is nothing to do beyond just to switch between the continuous current mode and the discontinuous current mode (i.e., when there is no need to suppress variation of the switching frequency), the on-time Ton may be basically set to a fixed value and may be extended only when the backflow of the coil current IL is detected. In this case, for example, the voltage/current converter X1 may be replaced with a constant current source; the level shifter Y11, the selector Y16, and the filter Y17 may be all omitted; a constant voltage may be applied to the first end of the resistor Y12; and the divided voltage Vb may be directly inputted, as the second voltage VY, to the inverting input terminal (+) of the comparator Z.

<Divided Voltage Boost Operation>

Figure 8:
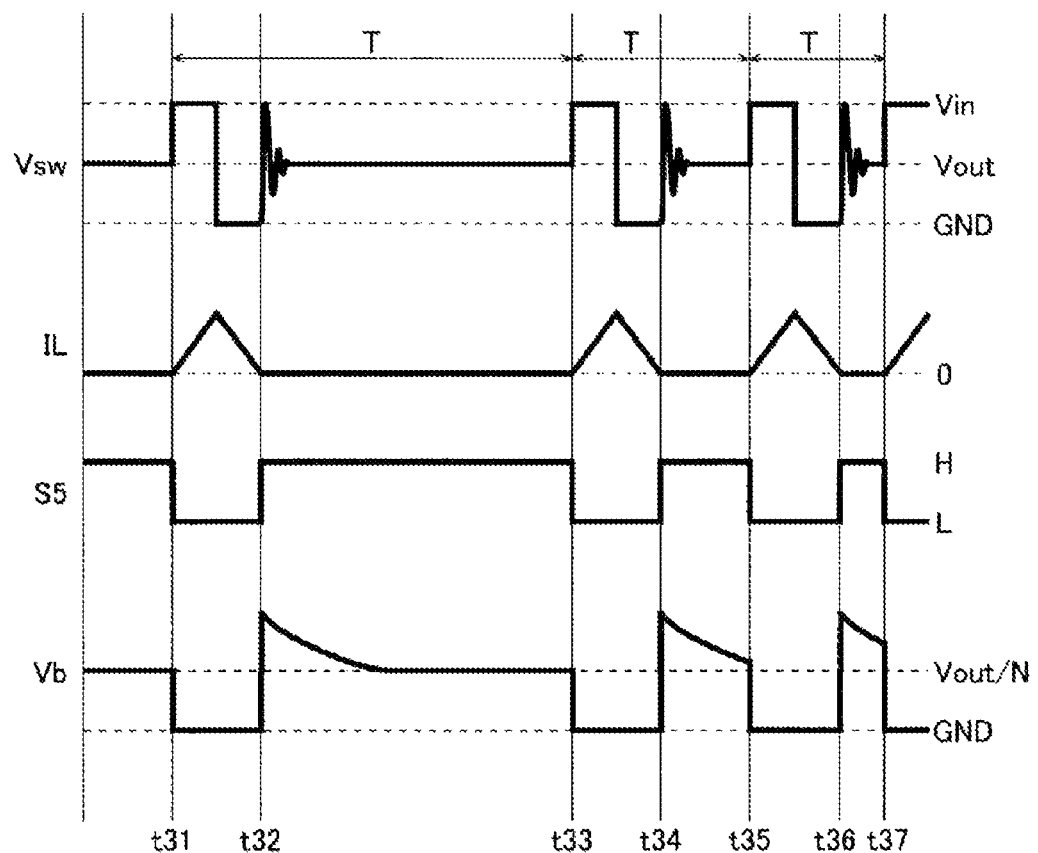
FIG. 8 is a timing chart showing one example of a divided voltage boost operation.

FIG. 8 is a timing chart showing one example of the divided voltage boost operation, depicting the switch voltage Vsw, the coil current IL, the backflow detection signal S5, and the divided voltage Vb in this order from top.

As indicated at a period from a time t31 to a time t32, a period from a time t33 to a time t34 or a period from a time t35 to a time t36, when the backflow of the coil current IL is not detected (S5=L), the transistor Y14 is turned off. Accordingly, the divided voltage Vb has a zero value (GND).

On the other hand, as indicated at a period from a time t32 to a time t33, a period from a time t34 to a time t35 or a period from a time t36 to a time t37, when the backflow of the coil current IL is detected (S5=H), the transistor Y14 is turned on. Accordingly, the divided voltage Vb has basically a voltage value (=Vout/N) obtained by dividing the output voltage Vout by the predetermined division ratio N.

However, a boost circuit including the transistor Y14 and the capacitor Y15 is included in the second voltage generator Y. Accordingly, at the time t32, the time t34 or the time t36, the coil current IL falls below the zero value and the backflow detection signal S5 rises to the high level. Then, the divided voltage Vb is instantaneously pulled up and is settled down to the original voltage value (=Vout/N) with a predetermined time constant τ.

If the switching period T of the transistor N1 is sufficiently long as indicated at the period from the time t31 to the time t33, the high level period of the backflow detection signal S5 is generally sufficiently lengthened; accordingly, the on-timing of the transistor N1 arrives as the divided voltage Vb is settled down to the original voltage value.

On the other hand, if the switching period T of the transistor N1 is short as indicated at the period from the time t33 to the time t35 or the period from the time t35 to the time t37, the high level period of the backflow detection signal S5 is shortened; accordingly, the on-timing of the transistor N1 arrives before the divided voltage Vb is decreased to the original voltage value.

In addition, since the selector Y16 selects and outputs the divided voltage Vb in the high level period of the backflow detection signal S5, the second voltage VY in accordance with the divided voltage Vb is generated. Therefore, according to the above-described divided voltage boost operation, the second voltage VY is intentionally pulled up from the original voltage value. In particular, the on-timing of the transistor N1 arrives with a higher divided voltage Vb as the switching period T becomes shorter with increase in the output current Iout; accordingly, the amount of pull-up of the second voltage VY increases.

Thereafter, the on-timing of the transistor N1 in the next period arrives and, when the backflow detection signal S5 falls to the low level, the selector Y16 is switched to a state where it selects and outputs the pulse voltage Va. At this time, the second voltage VY tries to return to the original voltage value corresponding to the pulse voltage Va. However, since the filter Y17 has a time constant, the second voltage VY cannot immediately return to the original voltage value.

As a result, when the backflow of the coil current IL is detected, the first voltage VX is compared with the intentionally pulled-up second voltage VY; accordingly, a timing at which the first voltage VX exceeds the second voltage VY (further a rising timing of the reset signal S3) is more delayed than when the backflow of the coil current IL is not detected, and the on-time Ton of the transistor N1 is extended. In particular, as the switching period T of the transistor N1 becomes shorter with an increase in the output current Tout, the amount of pull-up of the second voltage VY increases and the amount of the extension of the on-time Ton increases accordingly.

<On-time Extension Operation>

Figure 9:
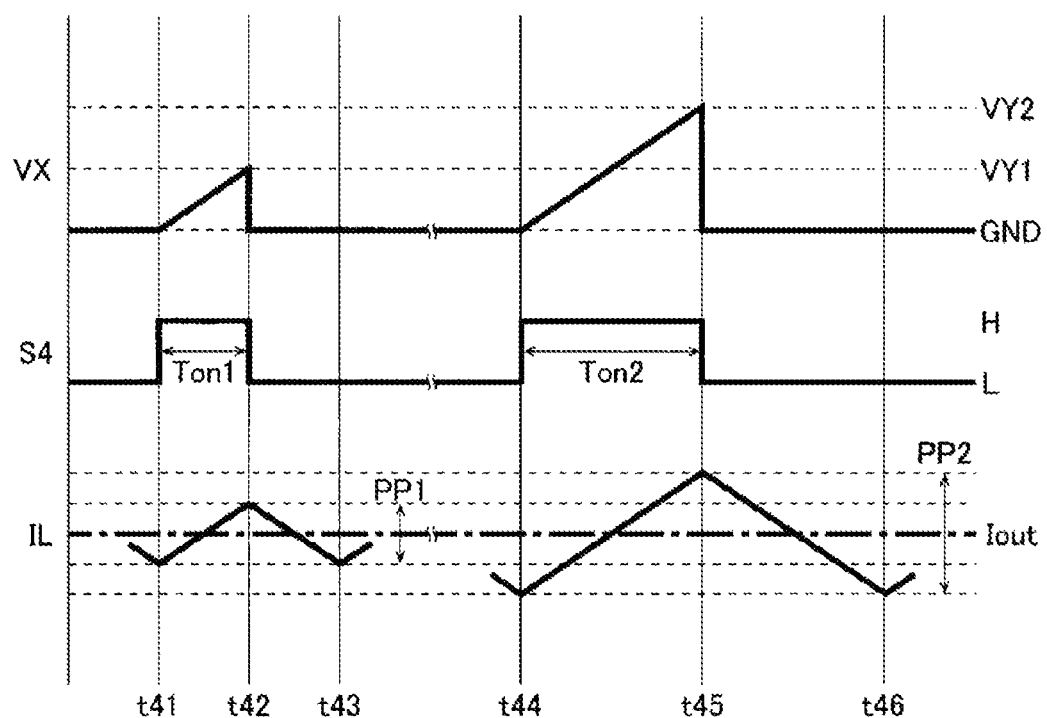
FIG. 9 is a timing chart used to explain the technical meaning of an on-time extension operation.

FIG. 9 is a timing chart used to explain the technical meaning of the on-time extension operation, depicting the first voltage VX, the output signal S4, and the coil current IL in this order from top.

When the second voltage VY is pulled up from "VY1" to "VY2," a timing at which the first voltage VX exceeds the second voltage VY is delayed; accordingly, the on-time Ton (corresponding to the high level period of the output signal S4) of the transistor N1 is extended from "Ton1" to "Ton2."

The coil current IL increases in the high level period of the output signal S4 and decreases in the low level period of the output signal S4. Accordingly, a peak-to-peak value PP of the coil current IL becomes larger as the high level period of the output signal S4 (corresponding to the on-time Ton) becomes longer.

The coil current IL having a large peak-to-peak value PP swings down to a value smaller than when the coil current IL is fluctuated up and down with the output current Iout as the center value. Accordingly, since the bottom value of the coil current IL is likely to be smaller than the zero value, the backflow of the coil current IL can be easily detected.

<Threshold Value Hysteresis>

Figure 10:
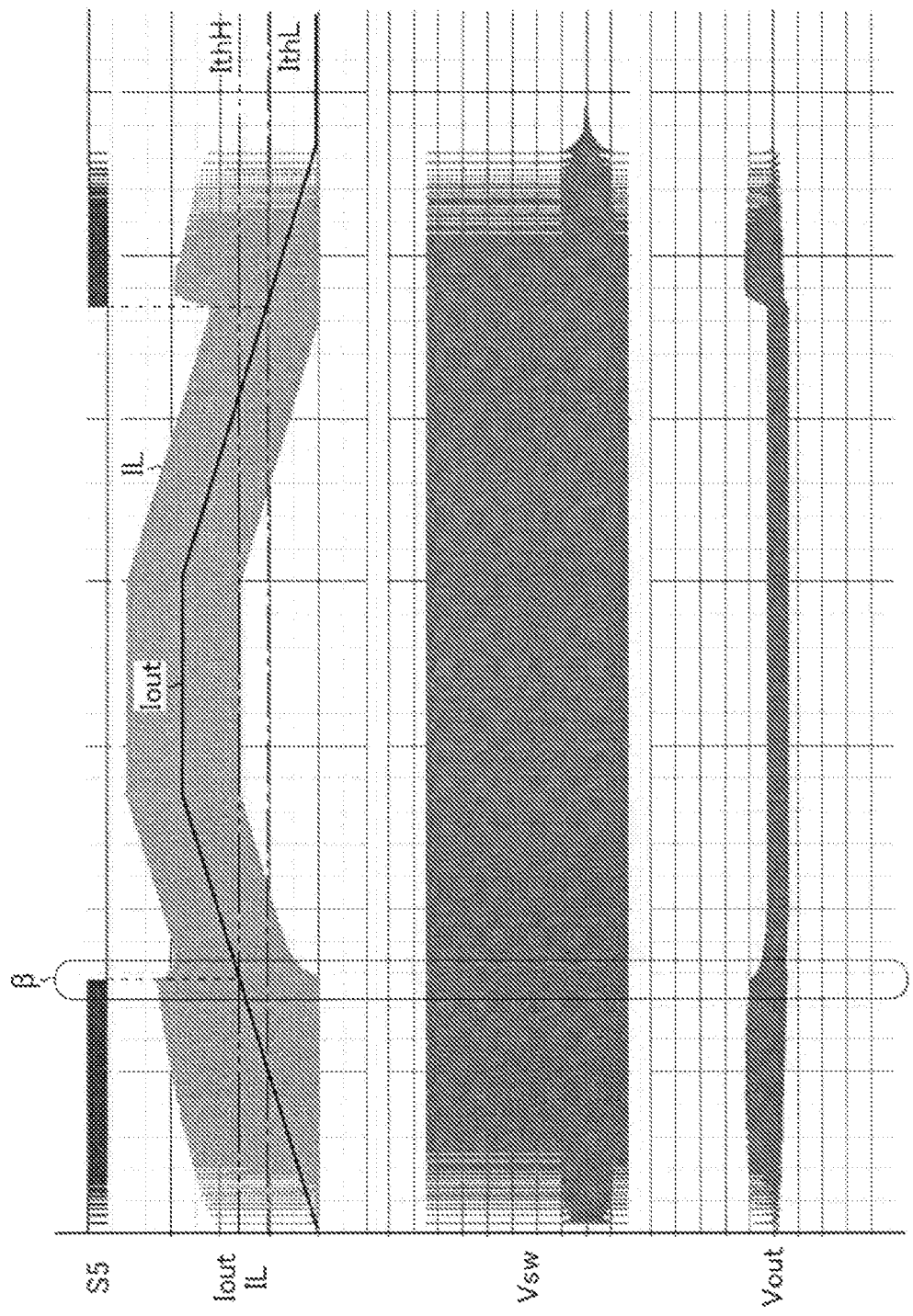
FIG. 10 is a timing chart showing a second transition example in output behavior depending on increase/decrease of load.
Figure 11:
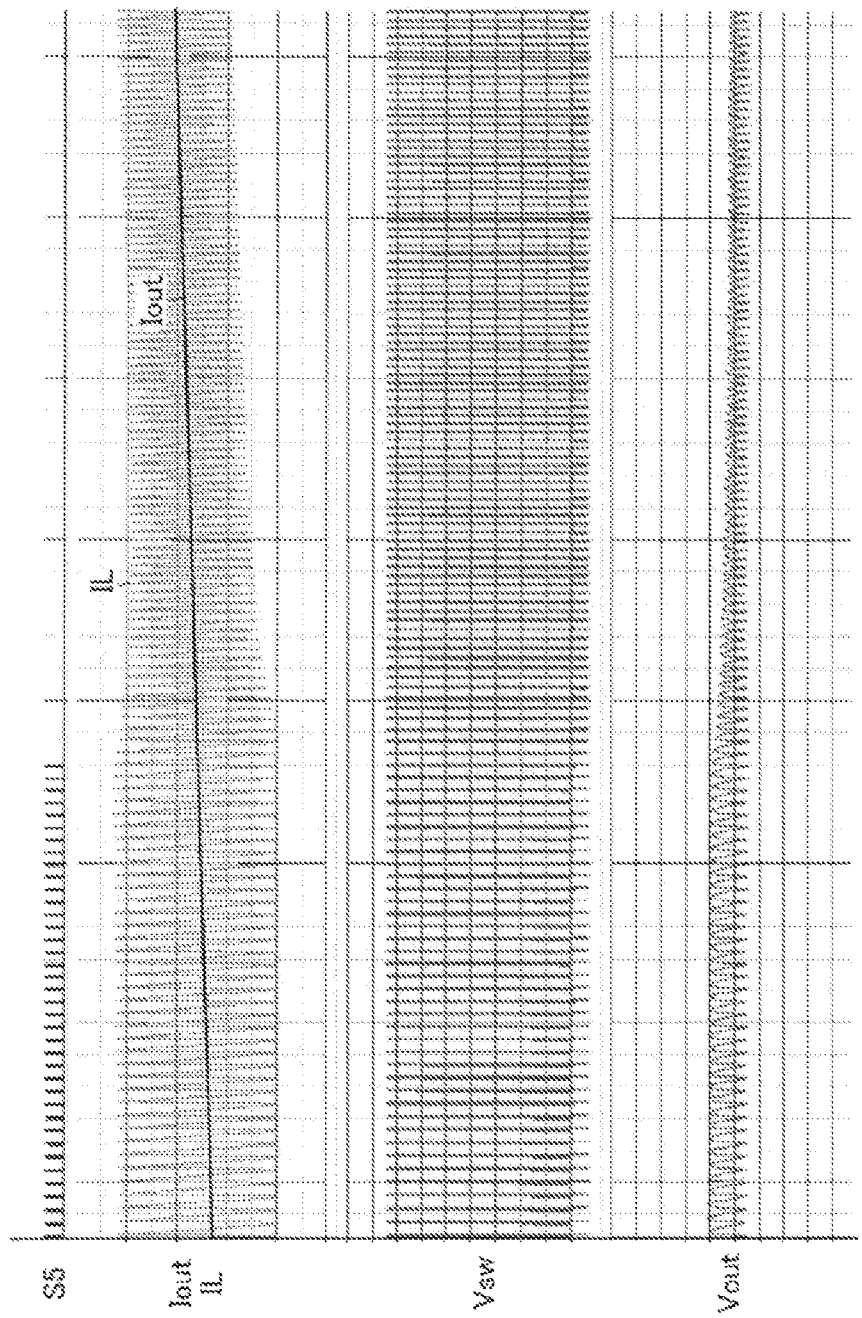
FIG. 11 is an enlarged view of a region β.

FIG. 10 is a timing chart showing a second transition example (with no offset to the threshold current Ith) in output behavior depending on increase/decrease of load, depicting the backflow detection signal S5, the output current Iout, the coil current IL, the switch voltage Vsw, and the output voltage Vout in this order from top. FIG. 11 is an enlarged view of a region β in FIG. 10.

Once the backflow of the coil current IL is detected and the operation transitions to the discontinuous current mode, the on-time Ton of the transistor N1 is intentionally extended according to the above-described on-time extension operation. Accordingly, in the discontinuous current mode, since the peak-to-peak value PP becomes larger, the bottom value of the coil current IL falls below the zero value.

In particular, in the above-described on-time extension operation, since the extension of the on-time Ton increases as the switching period T becomes shorter with increase in the output current Iout, the threshold current Ith for switching from the discontinuous current mode to the continuous current mode is shifted to the upper side.

As a result, the discontinuous current mode continues because the coil current IL falls below the zero value in the on-period of the transistor N2 until the output current Iout exceeds a threshold current IthH (for example, 1.5A).

On the other hand, when the output current Iout becomes larger than the threshold current IthH, even though the peak-to-peak value PP of the coil current IL is increased according to the above-described on-time extension operation, the coil current IL will not fall below the zero value in the on-period of the transistor N2. As a result, the discontinuous current mode is switched to the continuous current mode without the backflow detection signal S5 rising to the high level.

Once the operation is transitioned to the continuous current mode, the backflow detection signal S5 is maintained at the low level and the on-time Ton is not extended. As a result, the bottom value of the coil current IL will not fall below the zero value in the on-period of the transistor N2 until the output current Iout falls below a threshold current IthL (for example, 1.0A) that is lower than the threshold current IthH. Accordingly, the continuous current mode continues even when the output current Iout falls below the threshold current IthL.

This figure shows a state where, after the output current Iout exceeds the threshold current IthH, the peak-to-peak value PP of the coil current IL is decreased without the backflow detection signal S5 rising to the high level and as a result, the bottom value of the coil current IL is increased not to fall below zero.

As described above, the switching power supply 1 of this configuration example has a hysteresis between the threshold current IthH at the sweep-up of the output current Iout and the threshold current IthL at the sweep-down of the output current Iout according to the above-described on-time extension operation. With this configuration, since the continuous current mode and the discontinuous current mode are not irregularly repeated at the transition from the light load to the heavy load (or from the heavy load to the light load), a ripple component of the output voltage Vout can be reduced.

In addition, when the capacitance of the capacitor Y15 (see FIG. 7) is adjusted to change a boost behavior (time constant τ) of the divided voltage Vb, a hysteresis width of the threshold current Ith can be adjusted. However, the mode switching can be smoothly performed as long as the threshold current Ith, which is the operation mode switching point in both of the sweep-up and the sweep-down of the output current Iout, does not have the same value. In that sense, it is noted that there is no need to strictly set the hysteresis width of the threshold current Ith.

<Second Voltage Generator (Modification)>

Figure 12:
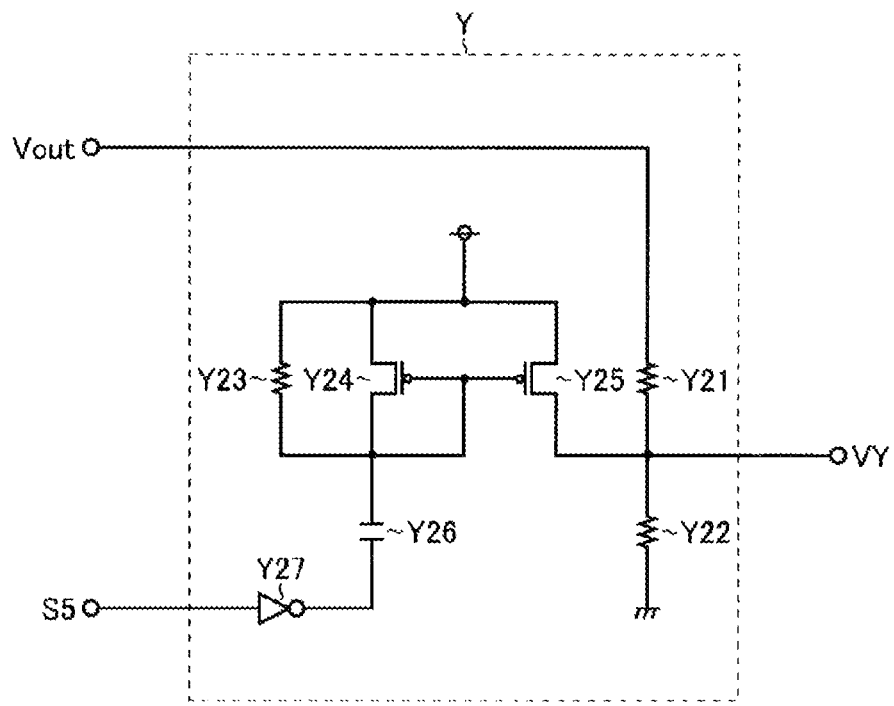
FIG. 12 is a circuit diagram showing a modification of the second voltage generator Y.

FIG. 12 is a circuit diagram showing a modification of the second voltage generator Y. In the modification, the second voltage generator Y includes resistors Y21 and Y22 (having resistances RY21 and RY22, respectively), a resistor Y23, P channel type MOS field effect transistors Y24 and Y25, a capacitor Y26, and an inverter Y27.

The first end of the resistor Y21 is connected to the application terminal of the output voltage Vout. The second end of the resistor Y21 and the first end of the resistor Y22 are both connected to the output terminal of the second voltage VY. The second end of the resistor Y22 is connected to the ground terminal. The first end of the resistor Y23 and the sources of the transistors Y24 and Y25 are all connected to a power supply terminal. The second end of the resistor Y23 and the gates of the transistors Y24 and Y25 are all connected to the drain of the transistor Y24. The drain of the transistor Y24 is connected to the first end of the capacitor Y26. The second end of the capacitor Y26 is connected to an output terminal of the inverter Y27. An input terminal of the inverter Y27 is connected to an input terminal of the backflow detection signal S5.

The resistors Y21 and Y22 function as a voltage divider for generating the second voltage VY (={RY22/(RY21+RY22)}×Vout) corresponding to the divided voltage of the output voltage Vout. In addition, the resistor Y23, the transistors Y24 and Y25, the capacitor Y26, and the inverter Y27 function as a boost circuit for instantaneously pulling up the second voltage VY in the case of detection of backflow of the coil current IL (S5=H) and then settling it down to the original voltage value with a predetermined time constant τ.

The second voltage generator Y can realize the boost operation of the second voltage VY with a very simple configuration and further smoothly switch between the continuous current mode and the discontinuous current mode.

<Application to Television>

Figure 13:
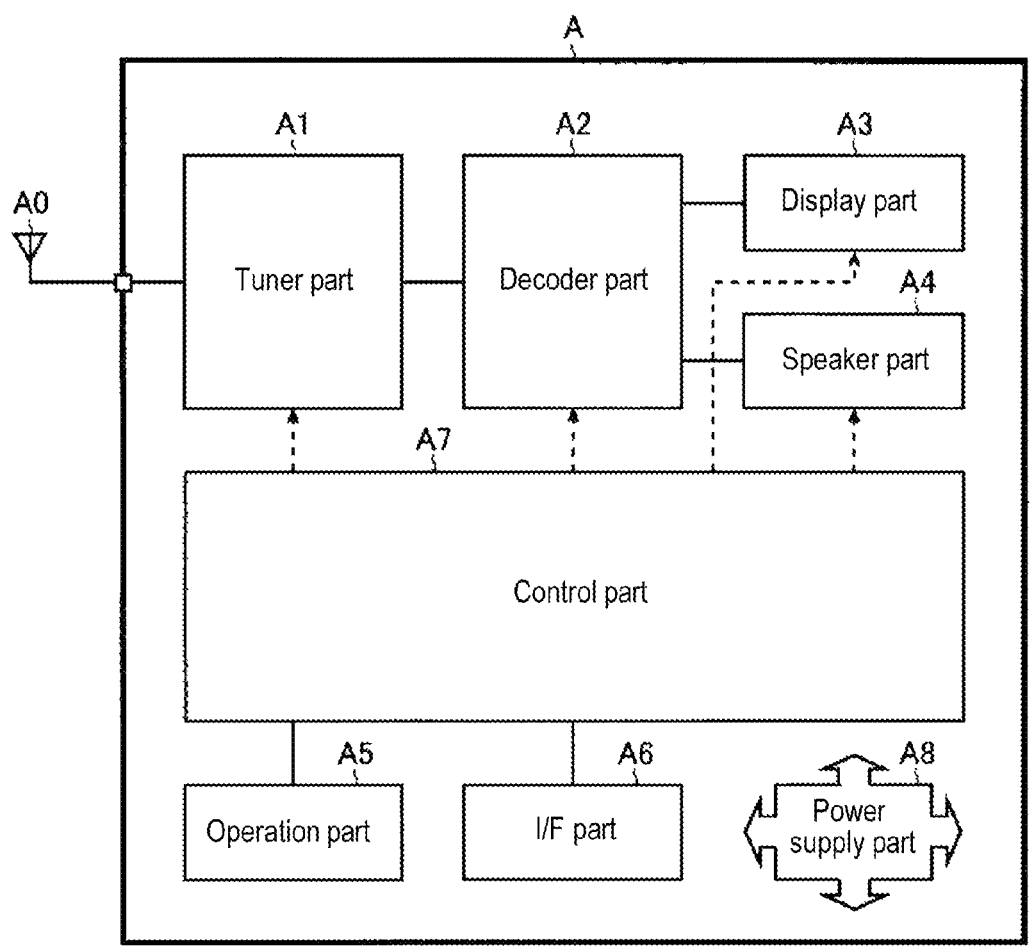
FIG. 13 is a block diagram showing one configuration example of a television equipped with the switching power supply.
Figure 14A:
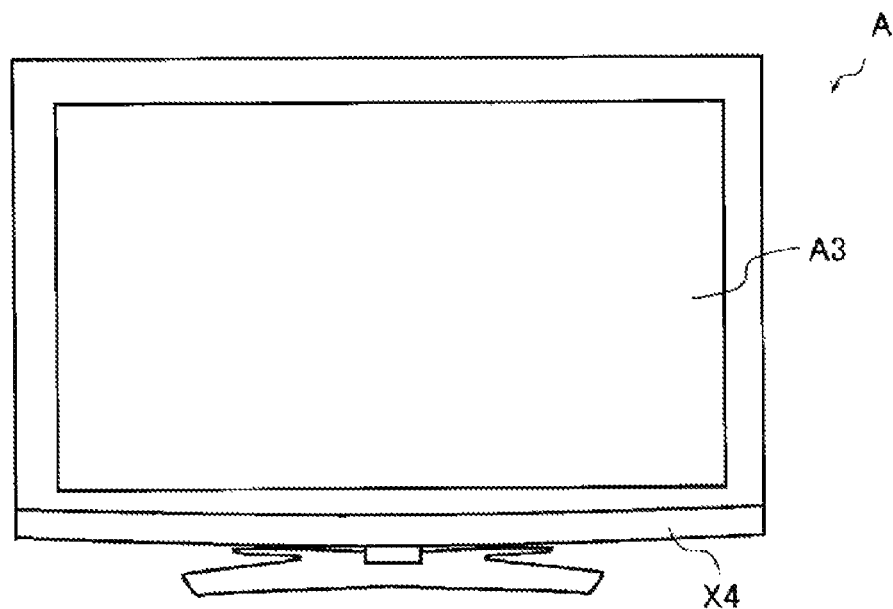
FIG. 14A is a front view of the television equipped with the switching power supply.
Figure 14B:
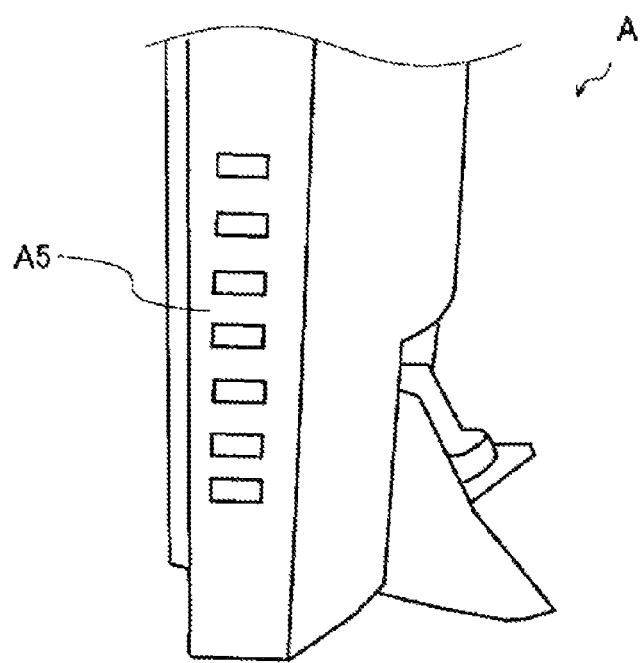
FIG. 14B is a side view of the television equipped with the switching power supply.
Figure 14C:
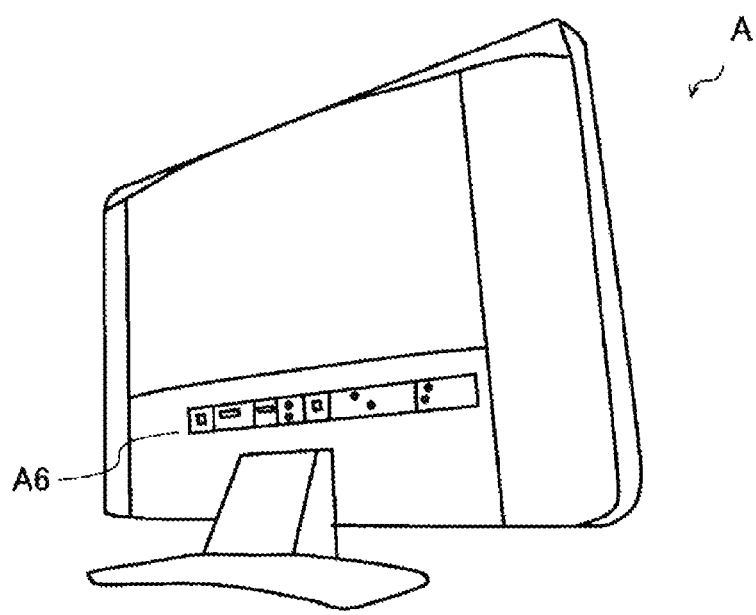
FIG. 14C is a rear view of the television equipped with the switching power supply.

FIG. 13 is a block diagram showing one configuration example of a television equipped with the above-described switching power supply. In addition, FIGS. 14A to 14C are a front view, a side view, and a rear view of the television equipped with the above-described switching power supply, respectively. The television A includes a tuner part A1, a decoder part A2, a display part A3, a speaker part A4, an operation part A5, an interface part A6, a control part A7, and a power supply part A8.

The tuner part A1 selects a broadcast signal of a desired channel from received signals received in an antenna A0 externally attached to the television.

The decoder part A2 generates a video signal and a sound signal from the broadcast signal selected by the tuner part A1. In addition, the decoder part A2 has a function to generate the video signal and the sound signal based on an external input signal from the interface part A6.

The display part A3 outputs the video signal that is generated by the decoder part A2 as a video.

The speaker part A4 outputs the sound signal that is generated by the decoder part A2 as a sound.

The operation part A5 is one of human interfaces for receiving a user operation. The operation part A5 may include buttons, switches, a remote controller, and the like.

The interface part A6 is a front end for receiving external input signals from external devices (an optical disc player, a hard disk drive, and so on).

The control part A7 generally controls the operation of the above components A1 to A6. The control part A7 can employ a CPU (Central Processing Unit) or the like.

The power supply part A8 supplies power to the above components A1 to A7. The above-described power supply 1 can be suitably used as the power supply part A8.

<Other Modifications>

Although the application of the present disclosure to the step-down switching power supply has been illustrated in the above embodiment, the present disclosure is not limited thereto. For example, the present disclosure may be applied to switching power supplies having a step-down, step-up/step-down, or inverted type output stage.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

According to the present disclosure in some embodiments, it is possible to provide a power supply control IC which is capable of smoothly switching between a continuous current mode and a discontinuous current mode, a switching power supply using the power supply control IC, and an electronic apparatus equipped with the switching power supply.

INDUSTRIAL APPLICABILITY

The switching power supply according to the present disclosure can be used as a power supply (for example, a power supply for SOC (System-On-Chip) or peripheral devices) equipped in various types of electronic apparatuses including a liquid crystal display, a plasma display, a BD recorder/player, a set-top box, a personal computer, and so on.

What is claimed is:

1. A power supply control IC comprising:
a switching control circuit of a fixed on-time type configured to generate an output voltage from an input voltage by driving an inductor by complementarily turning on/off an output transistor and a synchronous rectification transistor based on a result of comparison between a predetermined reference voltage and a feedback voltage in accordance with the output voltage,
wherein the switching control circuit extends an on-time of the output transistor more when a backflow of a coil current is detected than when the backflow is not detected, and
wherein the switching control circuit increases an amount of the extension of the on-time as a switching period of the output transistor becomes shorter.

2. A switching power supply comprising:
a power supply control IC of claim 1; and
a switch output stage that is partially or entirely externally attached to the power supply control IC and generates an output voltage from an input voltage.

3. An electronic apparatus comprising:
a switching power supply of claim 2; and
a load which is operated with an output voltage supplied from the switching power supply.

4. A power supply control IC comprising:
a switching control circuit of a fixed on-time type configured to generate an output voltage from an input voltage by driving an inductor by complementarily turning on/off an output transistor and a synchronous rectification transistor based on a result of comparison between a predetermined reference voltage and a feedback voltage in accordance with the output voltage,
wherein the switching control circuit extends an on-time of the output transistor more when a backflow of a coil current is detected than when the backflow is not detected, and
wherein the switching control circuit includes:
a reference voltage generation circuit that generates the reference voltage;
a main comparator that generates a comparison signal by comparing the feedback voltage with the reference voltage;
a one-shot pulse generation circuit that generates a one-shot pulse in a set signal in accordance with the comparison signal;
an RS flip-flop that sets an output signal to a first logical level in accordance with the set signal and resets the output signal to a second logical level in accordance with a reset signal;
an on-time setting circuit that generates a one-shot pulse in the reset signal when the on-time elapses after the output signal is set to the first logical level;
a gate driver circuit that generates a drive signal of the output transistor and the synchronous rectification transistor in accordance with the output signal; and
a backflow detection circuit that detects the backflow of the coil current and forcibly turns off the synchronous rectification transistor.

5. The power supply control IC of claim 4, wherein the switching control circuit further includes a ripple injection circuit that generates the feedback voltage by superimposing a ripple voltage simulating the coil current on a divided voltage of the output voltage.

6. The power supply control IC of claim 4, wherein the on-time setting circuit includes:
a first voltage generator that generates a first voltage having a ramp waveform;
a second voltage generator that generates a second voltage based on a result of the detection of the backflow of the coil current; and
a comparator that generates the reset signal by comparing the first voltage with the second voltage.

7. The power supply control IC of claim 6, wherein the second voltage generator includes:
a voltage divider that generates a divided voltage by dividing the output voltage; and
a boost circuit that instantaneously pulls up the divided voltage when the backflow of the coil current is detected and then settles the pulled-up voltage down to an original voltage value with a predetermined time constant,
wherein the second voltage generator outputs the divided voltage or a voltage in accordance with the divided voltage as the second voltage.

8. The power supply control IC of claim 7, wherein the voltage divider includes:
a first resistor having a first end connected to an application terminal of the output voltage; and
a second resistor having a first end connected to an output terminal of the divided voltage and a second end connected to a ground terminal, and
wherein the boost circuit includes:
a transistor having a drain connected to a second end of the first resistor, a source connected to the output terminal of the divided voltage, and a gate connected to an output terminal of the backflow detection circuit; and
a capacitor connected between the gate and the drain of the transistor.

9. The power supply control IC of claim 7, wherein the voltage divider includes:
a first resistor having a first end connected to an application terminal of the output voltage and a second end connected to an output terminal of the divided voltage; and
a second resistor having a first end connected to an output terminal of the divided voltage and a second end connected to a ground terminal, and
wherein the boost circuit includes:
a first transistor having a source connected to a power supply terminal, a gate, and a drain, the gate and the drain being connected in common;
a second transistor having a source connected to the power supply terminal, a drain connected to the output terminal of the divided voltage, and a gate connected to the gate of the first transistor;
a resistor connected between the source and the drain of the first transistor; and
a capacitor connected between the drain of the first transistor and an output terminal of the backflow detection circuit.

10. The power supply control IC of claim 7, wherein the second voltage generator generates the second voltage based on an on-duty cycle of the output transistor when the backflow of the coil current is not detected, and generates the second voltage based on the divided voltage when the backflow of the coil current is detected.

11. The power supply control IC of claim 6, wherein the first voltage generator generates the first voltage by charging or discharging a capacitor using a charging current in accordance with the input voltage.

12. A switching power supply comprising:
a power supply control IC of claim 4; and
a switch output stage that is partially or entirely externally attached to the power supply control IC and generates an output voltage from an input voltage.

13. An electronic apparatus comprising:
a switching power supply of claim 12; and
a load which is operated with an output voltage supplied from the switching power supply.

* * * * *